United States Patent
Chen

(10) Patent No.: US 7,609,685 B2
(45) Date of Patent: Oct. 27, 2009

(54) IP TELEPHONY APPARATUS PROVIDING SIMULTANEOUS SIP COMMUNICATION FOR MULTIPLE IP PHONES AND METHOD FOR THE SAME

(75) Inventor: Chi-Wen Chen, Hsinchu (TW)

(73) Assignee: Zyxel Communications Corp, Hsinchu (TW)

( * ) Notice: Subject to any disclaimer, the term of this patent is extended or adjusted under 35 U.S.C. 154(b) by 936 days.

(21) Appl. No.: 10/948,189

(22) Filed: Sep. 24, 2004

(65) Prior Publication Data

US 2006/0072546 A1 Apr. 6, 2006

(51) Int. Cl.
*H04L 12/66* (2006.01)

(52) U.S. Cl. .................. 370/352; 370/230; 370/261; 370/356; 370/390; 455/432.1; 709/218; 709/227

(58) Field of Classification Search .......... 370/419, 370/352, 353, 230, 261, 356, 390; 455/432.3, 455/432.1; 709/227, 218
See application file for complete search history.

(56) References Cited

U.S. PATENT DOCUMENTS

| | | | | |
|---|---|---|---|---|
| 6,735,621 B1 * | 5/2004 | Yoakum et al. | ............. | 709/218 |
| 6,795,448 B1 * | 9/2004 | Lee et al. | ............. | 370/419 |
| 7,023,867 B1 * | 4/2006 | Park et al. | ............. | 370/419 |
| 7,024,192 B2 * | 4/2006 | Aoki et al. | ............. | 455/432.3 |
| 7,162,236 B2 * | 1/2007 | Dorenbosch et al. | ...... | 455/432.1 |
| 7,283,519 B2 * | 10/2007 | Girard | ............. | 370/353 |
| 7,289,493 B1 * | 10/2007 | Vera | ............. | 370/356 |
| 7,525,955 B2 * | 4/2009 | Velez-Rivera et al. | ....... | 370/352 |
| 2003/0023730 A1 * | 1/2003 | Wengrovitz et al. | ......... | 709/227 |
| 2004/0095925 A1 * | 5/2004 | Cody et al. | ............. | 370/352 |
| 2004/0125802 A1 * | 7/2004 | Lillie et al. | ............. | 370/390 |
| 2005/0207358 A1 * | 9/2005 | Nishida et al. | ............. | 370/261 |
| 2006/0195584 A1 * | 8/2006 | Baumann | ............. | 709/227 |
| 2007/0058533 A1 * | 3/2007 | Forissier et al. | ............. | 370/230 |
| 2008/0168172 A1 * | 7/2008 | Keller et al. | ............. | 709/227 |

\* cited by examiner

*Primary Examiner*—Gerald Gauthier

(57) ABSTRACT

An IP telephony apparatus provides simultaneous SIP communication for multiple IP phones and a method is proposed for the same. The IP telephony apparatus comprises a network connection port connected to a network; a plurality of telephone connection ports connected to a plurality of telephone sets; a voice codec unit connected to the telephone connection ports and used for converting a voice signal to a digital voice packet and for converting a digital voice packet to a voice signal; and an IP telephony allocation unit connected to the network connection port and the plurality of telephone connection ports. The IP telephony allocation unit creates an SIP control block containing an SIP call-leg for a local SIP number, and allocates the SIP control block to a destination telephone set according to the SIP call-leg, whereby the telephone sets have bi-directional digital voice packet transmission with a remote SIP number.

10 Claims, 6 Drawing Sheets

IP TELEPHONY APPARATUS PROVIDING SIMULTANEOUS SIP COMMUNICATION FOR MULTIPLE IP PHONES AND METHOD FOR THE SAME

BACKGROUND OF THE INVENTION

1. Field of the Invention

The present invention relates to an IP telephony apparatus providing simultaneous communication for multiple IP phones and a method for the same, especially to an IP telephony apparatus providing simultaneous SIP communication for multiple IP phones by using only one SIP number and a method for the same.

2. Description of Prior Art

The progress of Internet technology provides innovative ideas and new services. For example, the VoIP (Voice over Internet Protocol) technique provides telephony communication through IP network and the expensive long-distance call fee can be saved. More particularly, the VoIP technique provides PC-to-PC telephony communication through IP network, PC-to-Phone telephony communication through PBX (private branch box), Phone-to-Phone telephony communication through ISP gateway and Device-to-Device telephony communication through IP Phones.

The VoIP technique provides suitable telephony signal and voice transmission for conveying phone call through IP network. The VoIP technique sends telephony signal with specific protocol to represent user status and to establish communication for user. Once the communication is established for user, the voice is compressed and digitalized to transmit in the form of digital signal.

The conventional telephony signals such as dialing signals, ringing signal, and busy signal are converted into data packets according to VoIP protocol and the data packets a resent to remote user through IP network. The data packets are then converted to analog telephony signal by remote IAD or ATA for the operation of remote telephone set.

After the connection is established, the analog voice is sent to a local router through a telephone set, a fax or a PBX. The analog voice is compressed and digitalized into data packets and the data packets are sent to remote router through IP network. The data packets are converted to analog voice signal by the remote router and then sent to remote user through a telephone set, a fax or a PBX. The user can make cheaper long-distance phone call using VoIP technique through omnipresent IP network instead of the conventional PSTN system.

The present VoIP technique is regulated by ITU (International Telecommunication Union) and the earlier protocol such as H323/H248 are defined for LAN rather than the open environment of Internet. Therefore the H323/H248 protocol has limited application and complicated conversion for PSTN system. A new protocol, namely SIP (Session Initiation Protocol) protocol, is defined by IETF (Internet Engineering Task Force) to fully exploit the Internet service and provide better integration of Internet and PSTN system.

The SIP protocol belongs to the application layer protocol in the seven-layer architecture of the OSI (Open System Interface) and is resemblant to the Client-Server structure in HTTP protocol. Therefore, the SIP protocol can utilize existing HTTP packet structure for sending command and data and can be adapted for data transmission in WAN.

In present VoIP telephone system, a UA ((User Agent) such as a VoIP gateway is need to install at user side and at least one call server should be installed at VoIP agent. Moreover, the VoIP user needs to register an SIP VoIP number to the VoIP agent. Therefore, other VoIP user can call him through the SIP VoIP number.

However, the nowadays VoIP gateway generally uses VoIP H323/H248 protocol and a VoIP telephone set such as a USB telephone set is required. When the VoIP gateway is connected to multiple VoIP telephone sets, each of the VoIP telephone set needs a unique SIP VoIP number to prevent blocked call. Therefore, the conventional VoIP gateway needs at least two SIP VoIP numbers for two VoIP telephone sets to prevent blocked call.

SUMMARY OF THE INVENTION

It is an object of the present invention to provide an IP telephony apparatus providing simultaneous SIP communication for multiple IP phones by using only one SIP number and a method for the same, wherein a call-leg is used to designate different SIP. The call-leg is established only when an SIP number is dialed in or out. The SIP call-leg can be dynamically created with no limitation on number thereof, whereby simultaneous SIP communication for multiple IP phones can be provided without blocked problem.

To achieve the above object, the present invention provides an IP telephony apparatus provides simultaneous SIP communication for multiple IP phones. The IP telephony apparatus comprises a network connection port connected to a network; a plurality of telephone connection ports connected to a plurality of telephone sets; a voice codec unit connected to the telephone connection ports and used for converting a voice signal to a digital voice packet and for converting a digital voice packet to a voice signal; and an IP telephony allocation unit connected to the network connection port and the plurality of telephone connection ports. The IP telephony allocation unit creates an SIP control block containing an SIP call-leg for a local SIP number, and allocates the SIP control block to a destination telephone set according to the SIP call-leg, whereby the telephone sets have bi-directional digital voice packet transmission with a remote SIP number.

To achieve the above object, the present invention provides a method providing simultaneous phone dialing for multiple IP phones. The method comprises following steps. A remote SIP number is dialed with at least one telephone set. A local SIP number is found for communication with the remote SIP number by a mapped policy means. At least one SIP control block containing an SIP call-leg is created for the local SIP number. The SIP control block is allocated to the dialing telephone set according to the SIP call-leg and to establish a bi-directional digital voice packet transmission between the dialing telephone set and the remote SIP number. When one telephone is using, other telephones can establish new SIP control block with SIP call-leg to dial out and will not suffer to the blocked problem.

To achieve the above object, the present invention provides a method providing simultaneous call receiving for multiple IP phones. The method comprises following steps. A phone call from a remote SIP number for calling a local SIP number is received. At least one SIP control block containing an SIP call-leg is created for a telephone group containing a plurality of telephone sets for making a ringing for all telephone sets in the telephone group. When a telephone set of the telephone group is off hook, the SIP control block is allocated to the off-hook telephone set and the SIP control block is prevented from connecting to other telephone sets to establish a bi-directional digital voice packet transmission between the off-hook telephone set and the remote SIP number. When one telephone is using, the local SIP number for other telephones can establish new SIP control block with SIP call-leg to receive phone call and will not suffer to the blocked problem.

To achieve the above object, the present invention provides a method providing simultaneous call dialing and call receiving for multiple IP phones. The method combines the procedures mentioned in above two paragraphs and comprises following steps: A remote SIP number is dialed with at least one telephone set. At least one SIP control block containing an SIP call-leg is created for the local SIP number. The SIP control block is allocated to the dialing telephone set according to the SIP call-leg and to establish a bi-directional digital voice packet transmission between the dialing telephone set and the remote SIP number. When a remote SIP number calls the local SIP number, at least one SIP control block containing an SIP call-leg is created for a telephone group for making a ringing for all telephone sets in the telephone group. When a telephone set of the telephone group is off hook, the SIP control block is allocated to the off-hook telephone set to prevent the SIP control block from connecting to other telephone sets to establish a bi-directional digital voice packet transmission between the off-hook telephone set and the remote SIP number. The procedure is similar for a telephone group firstly receiving a phone call and then dialing a phone call.

The above summaries are intended to illustrate exemplary embodiments of the invention, which will be best understood in conjunction with the detailed description to follow, and are not intended to limit the scope of the appended claims.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
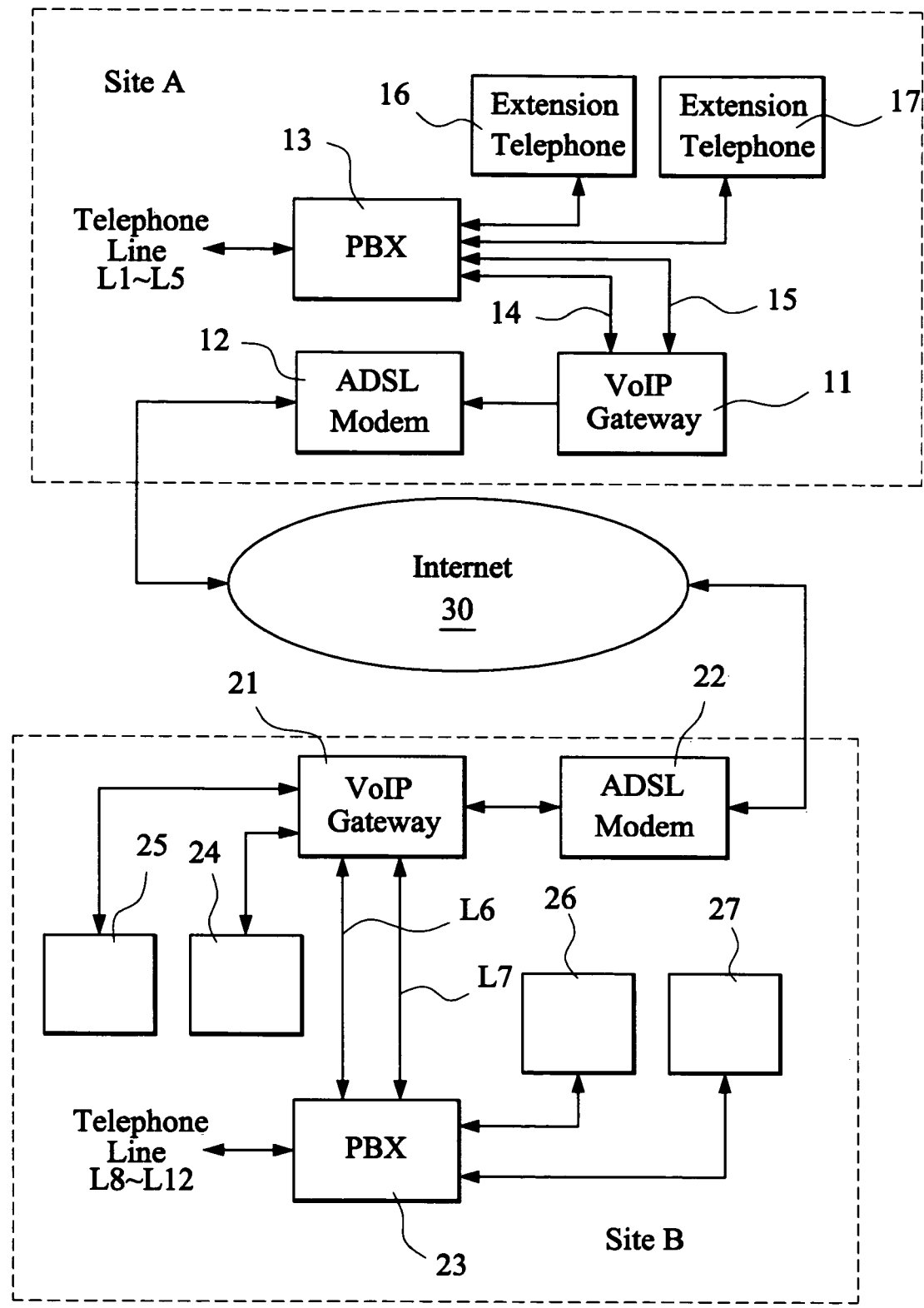
FIG. 1 shows an application of the IP telephony apparatus according to the present invention.

FIG. 1 shows an application of the IP telephony apparatus according to the present invention. The IP telephony apparatus according to the present invention provides busy-free communication for multiple VoIP telephone sets by using only one VoIP telephone number. The IP telephony apparatus according to the present invention adopts SIP VoIP protocol and can be an IP phone gateway, an ADSL modem, an ADSL router, a cable modem or a wireless network access point, etc.

The IP telephony apparatus according to the present invention supports two interface standards, namely, an FXS (Foreign eXchange Station) interface standard and an FXO (Foreign eXchange Office) interface standard. The FXS interface standard produces an FXS simulation signal for simulating a PSTN telephone line signal, and the FXS simulation signal can be connected to any PSTN telephony facility such as telephone set, wireless telephone set, fax or PBX.

The FXO interface standard generates an FXO simulation signal for simulating a PSTN facility signal and the FXO simulation signal can be connected to PSTN telephone line or extension line of PBX. In FIG. 1, the IP telephony apparatus according to the present invention has above-mentioned two interface standards and is connected between site A and site B.

In FIG. 1, the site A is a company in China and uses an FXO VoIP gateway 11 for accessing Internet 30 through an ADSL modem 12. The FXO VoIP gateway 11 is connected to a PBX 13 through extension lines 14, 15 and the PBX 13 is connected to a plurality of PSTN telephone lines L1-L5 and a plurality of extension telephones 16, 17.

In FIG. 1, the site B is a company in Taiwan and uses an FXS VoIP gateway 21 for accessing Internet 30 through an ADSL modem 22. The FXS VoIP gateway 21 is connected to a plurality of telephone sets 24, 25 and connected to a PBX 23 through telephone lines L6-L7. The FXS VoIP gateway 21 is connected to a plurality of extension telephones 26, 27 and a plurality of PSTN telephone lines L8-L12 through the PBX 23.

When a user at site B makes a phone call to site A, the phone is transferred from Taiwan to China through Internet instead of international telephony network. The user at site B also can make phone call to other places in China through the PBX 13 at site A. In this situation, the user at site B only pays local-call fee, which is similar to domestic call fee in China.

When a user at site A makes a phone call to site B, the user at site A will hear dial tone and the telephone sets 24, 25 at site B will ring simultaneously. The user at site A (China) can make phone call to any place in Taiwan through the PBX 23 at side B and vice versa. This means that the a call in Taiwan can be transferred to site A through telephone line to PBX 23 and Internet, just like domestic call in Taiwan.

Figure 2:
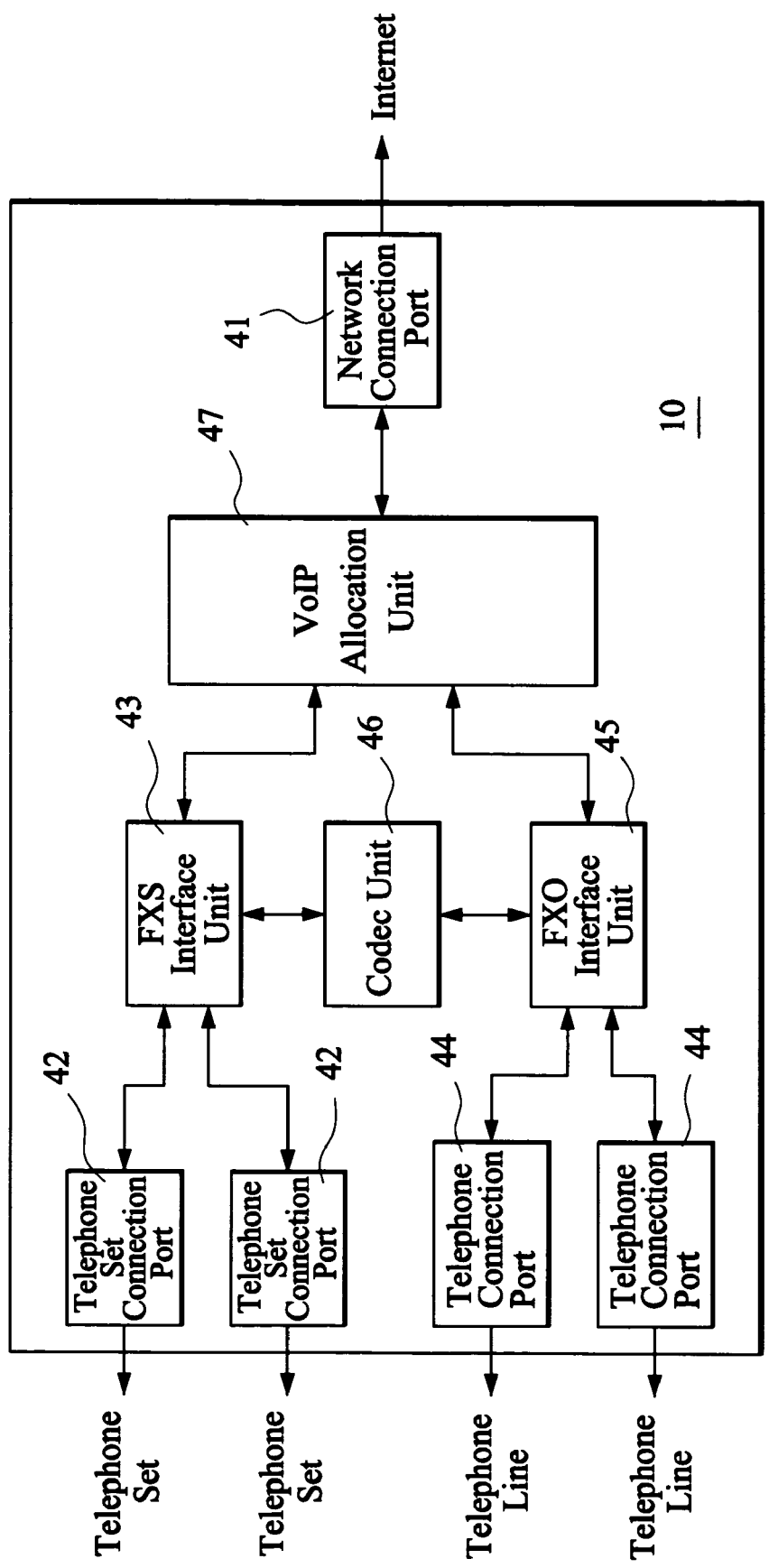
FIG. 2 shows a block diagram of the IP telephony apparatus according to the present invention.

FIG. 2 shows a block diagram of the IP telephony apparatus 10 according to the present invention. As shown in this figure, the IP telephony apparatus 10 comprises a network connection port 41, a plurality of telephone set connection ports 42, an FXS interface unit 43, a plurality of telephone connection ports 44, an FXO interface unit 45, a codec unit 46 and a VoIP allocation unit 47.

The network connection port 41 can be an RJ-45 jack for connecting a network such as Internet or connecting a network through a network device. The telephone set connection port 42 can be a PSTN RJ-11 jack for connecting to telephony facilities such as telephone set, wireless handset, fax or PBX, etc.

The FXS interface unit 43 is connected between the telephone set connection ports 42 and the codec unit 46 and is used to produce an FXS simulation signal for simulating a PSTN telephone line signal. Therefore, the telephone set connection ports 42 can be directly connected to telephone set, fax or PBX telephone line.

The telephone connection ports 44 are connected to PBX extension line or telephone line of central exchange. The FXO interface unit 45 is connected between the telephone connection ports 44 and the codec unit 46 and is used to produce an FXO simulation signal for simulating a PSTN facility signal.

The codec unit 46 is a DSP unit to convert voice signal from telephone line or telephone into digital SIP packet and to convert digital SIP packet into voice signal.

The VoIP allocation unit 47 is an SIP processor and connected among the network connection port 41, the FXS interface unit 43 and the FXO interface unit 45. The VoIP allocation unit-47 is functioned to process SIP packet for SIP VoIP phone call and allocate the connection between SIP service and physical phone. The VoIP allocation unit 47 establishes at least one control block in a local SIP number and the control block has a call leg. The call leg includes a call from field, a call to field and a call-ID field.

The VoIP allocation unit 47 allocates an SIP control block to any unused telephone set according to the call-leg and the telephone set allocated with the SIP control block can establish duplex voice packet transmission with external SIP number.

Figure 3:
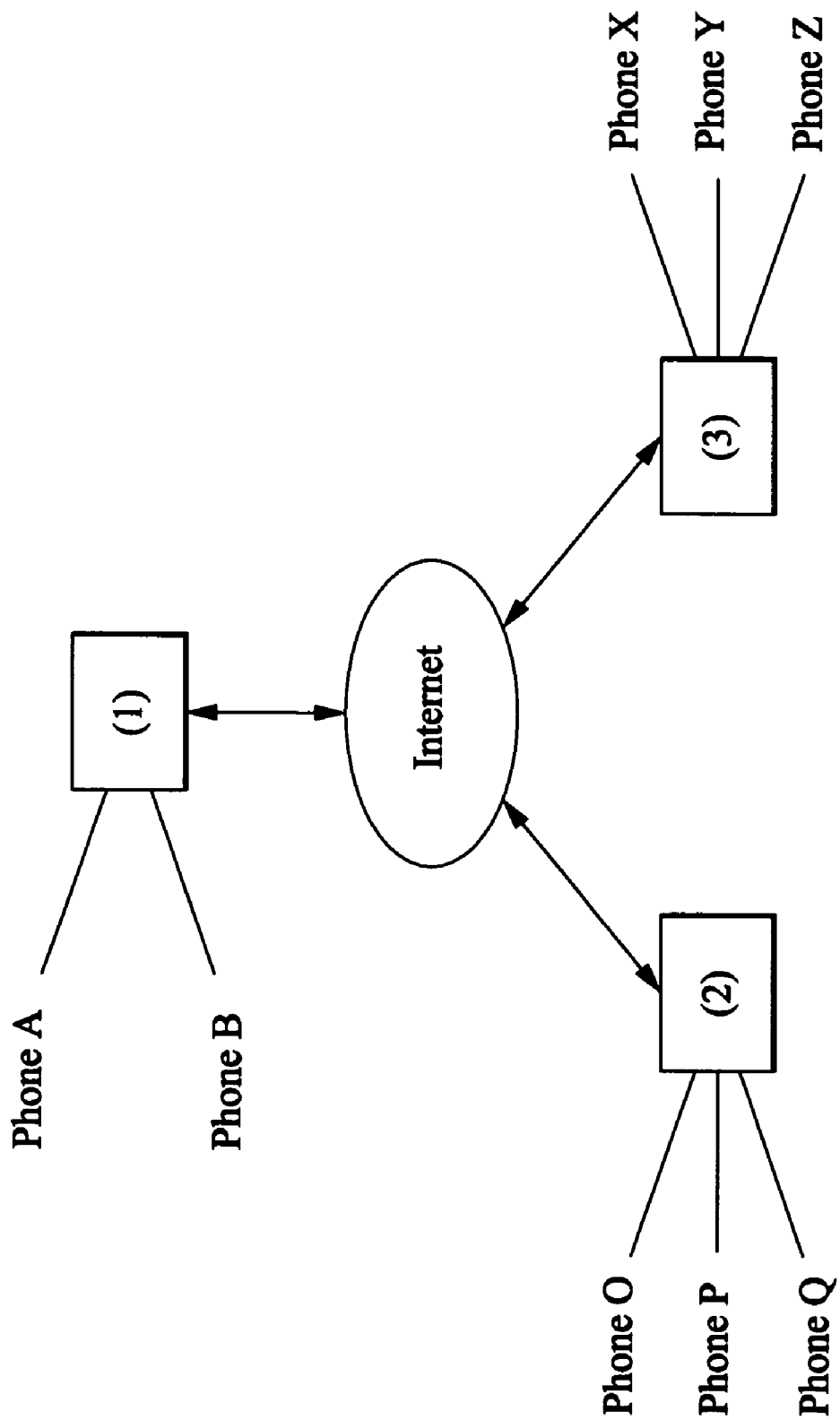
FIG. 3 shows an application of the present invention.
Figure 4:
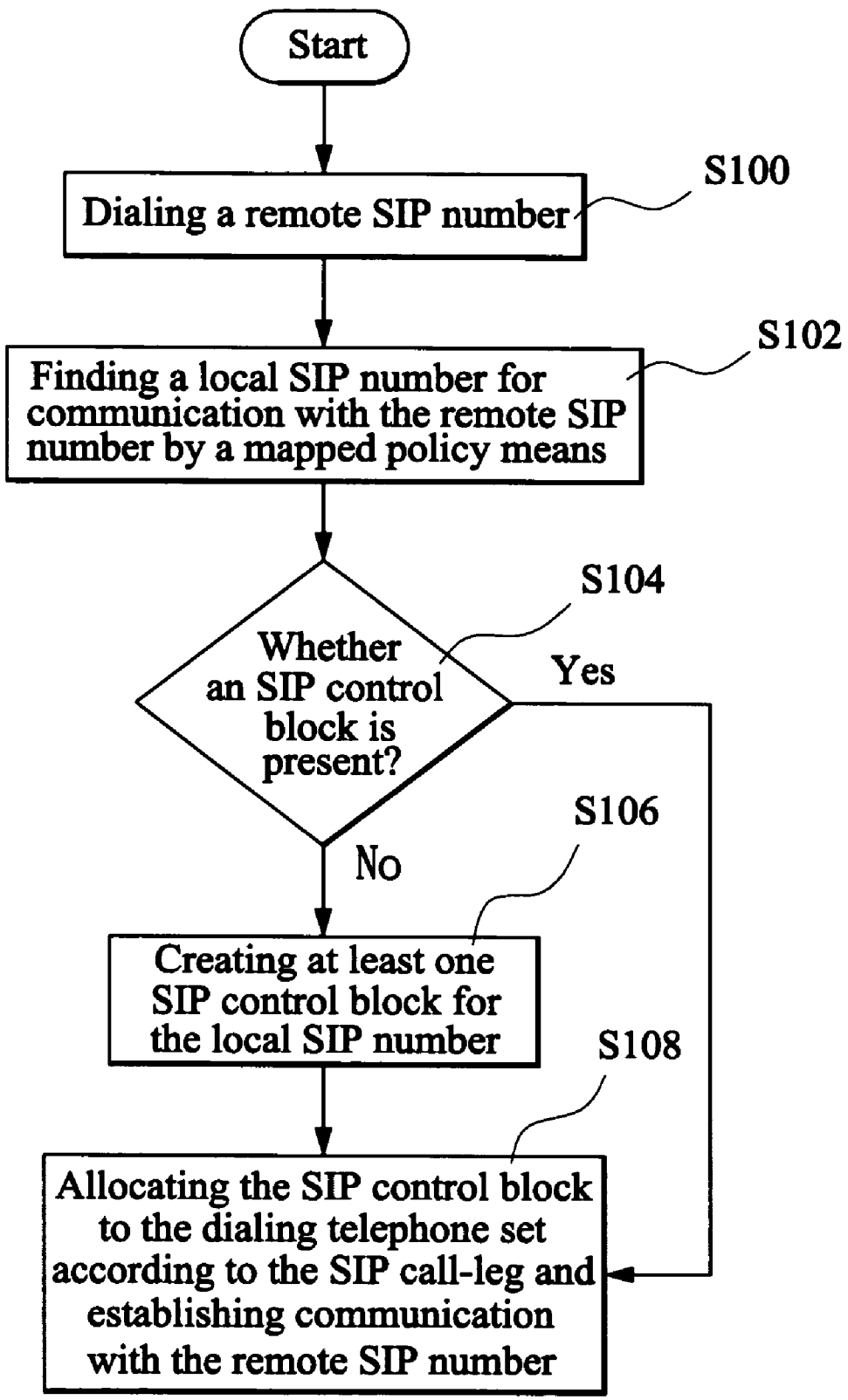
FIG. 4 shows a flowchart of dialing phone call through the IP telephony apparatus according to the present invention.

FIG. 3 shows an application of the present invention. FIG. 4 shows a flowchart of dialing phone call through the IP telephony apparatus according to the present invention. FIG. 4 shows a flowchart of receiving phone call through the IP telephony apparatus according to the present invention.

In this example, the IP telephony apparatus according to the present invention is used in site (1), site (2) and site (3) for accessing Internet. There are two phones (phone A and phone B) at site (1); three phones (phone O, phone P and phone Q) at site (2); and three phones (phone X, phone Y and phone Z) at site (3). In this example, each of the site (1), the site (2), and the site (3) is assigned with one SIP number.

As shown in FIG. 3, when the phone A at site (1) is off hook for dialing an SIP number at site (2) in step S100, the IP telephony apparatus 10 at site (1) finds an SIP number at site (1) by a mapped policy means for establishing communication link with the SIP number at site (2) in step S102. In this situation, there are multiple SIP numbers at site (1), and one of the multiple SIP numbers at site (1) is selected for communication.

The IP telephony apparatus 10 at site (1) then examines whether an unused control block is present in the selected SIP number in step S104. If an unused control block is not present, a new SIP control block is created in the SIP number at site (1) in step S106 and the SIP control block has an SIP call-leg. The SIP call-leg includes a call from field, a call to field and a call-ID field.

If an unused control block is present, the step of creating new SIP control block is skipped and the unused control block is used to set new SIP call-leg. The SIP call-leg includes a call from field, a call to field and a call-ID field.

The SIP control block is allocated to the phone A at site (1) in step S108 and SIP packet is sent to the IP telephony apparatus 10 at site (2) according to the SIP control block.

Figure 5:
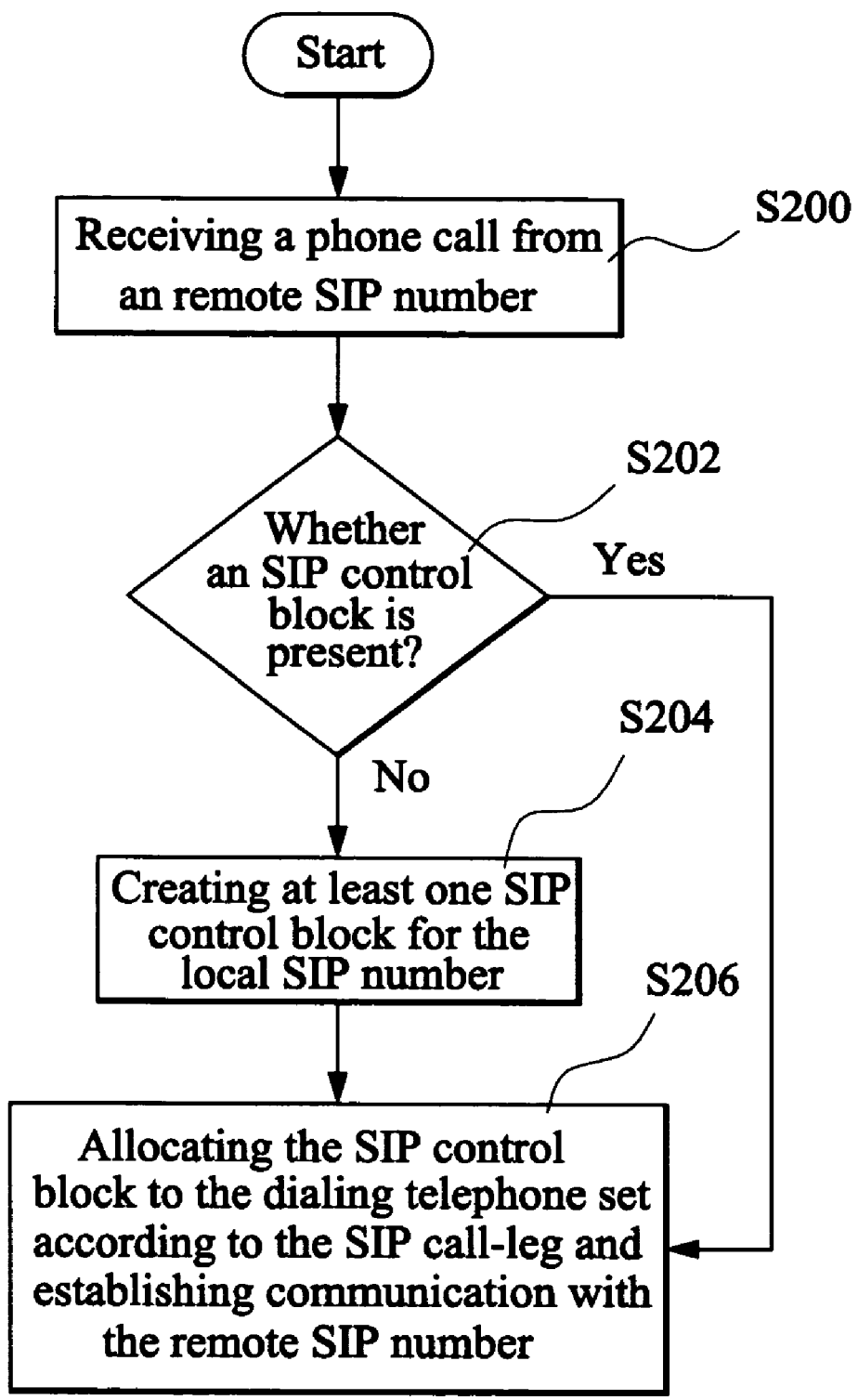
FIG. 5 shows a flowchart of receiving phone call through the IP telephony apparatus according to the present invention.

As shown in FIG. 5, the IP telephony apparatus 10 at site (2) receives the SIP packet and resolves the SIP call-leg therein. The IP telephony apparatus 10 at site (2) finds the SIP call-leg indicating the SIP number at site (1) calling an SIP number at site (2) in step S200. The IP telephony apparatus 10 at site (2) will examine whether an unused SIP control block is present in step S202. If an unused control block is not present, a new SIP control block is created in the SIP number at site (2) in step S204 and the SIP control block has an SIP call-leg.

If an existing SIP control block is present or an unused SIP control block is present, the step of creating new SIP control block is skipped and the existing SIP control block is used to set new SIP call-leg. The SIP call-leg includes a call from field, a call to field and a call-ID field.

The IP telephony apparatus 10 at site (2) then allocates the SIP control block to the phone O, phone Pa and phone Q such that all the three phones will ring in step S206. At this time a ring-back signal is sent to the IP telephony apparatus 10 at site (1) and the user of phone A receives a ring-back tone.

When the phone O enters an off-hook state, the IP telephony apparatus 10 at site (2) ceases the ring tone for phone P and phone Q and allocates the SIP control block to phone O.

Figure 6:
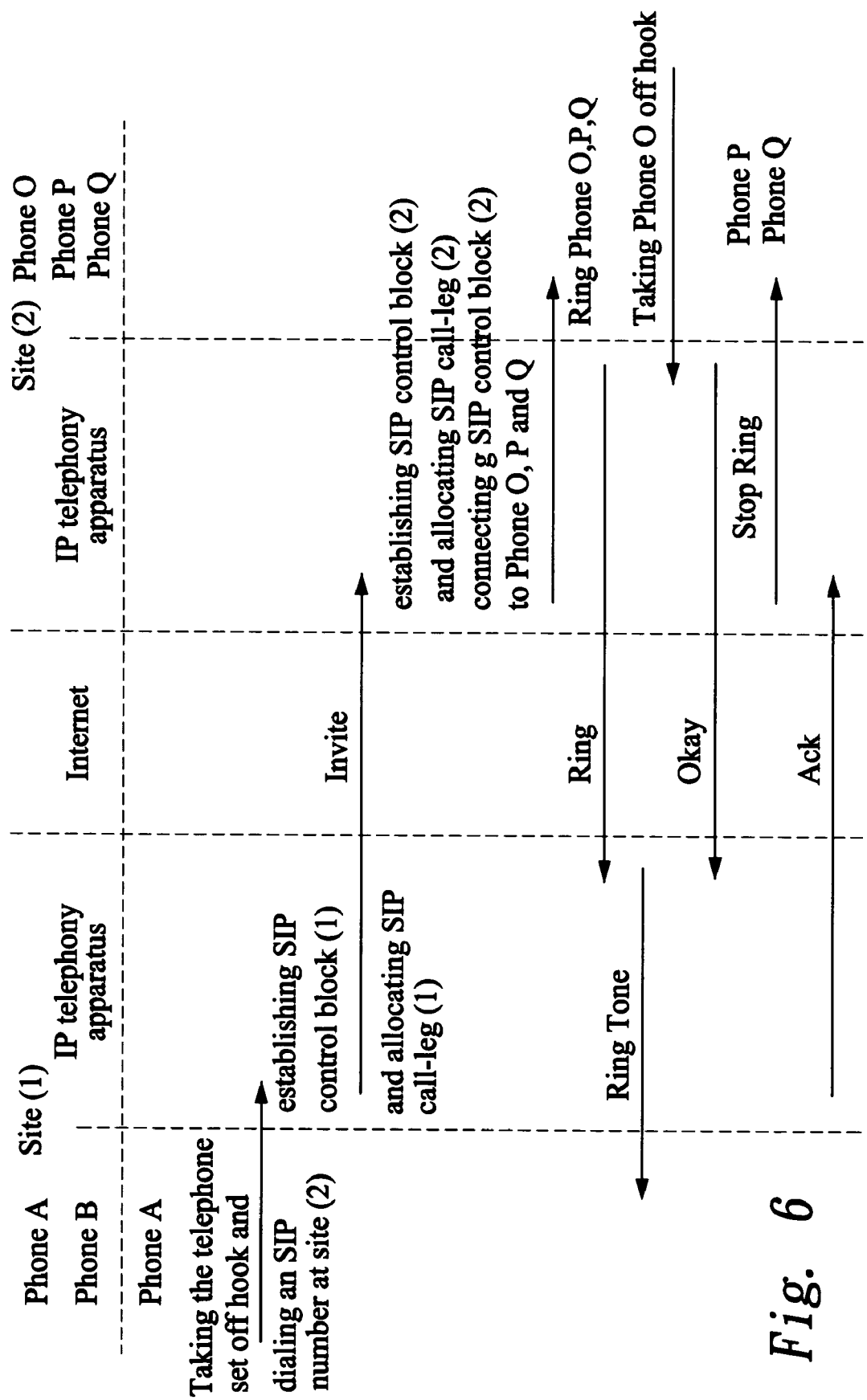
FIG. 6 shows the flowchart of communication procedure for the present invention.

The IP telephony apparatus 10 at site (2) further breaks the connection of the control block to phone P and phone Q and sends an Okay signal to IP telephony apparatus 10 at site (1) for permitting conversation. The IP telephony apparatus 10 at site (1) will respond an ACK (acknowledgement) signal to the IP telephony apparatus 10 at site (2). Afterward, the terminal at site (1) has bi-directional voice packet transmission with the terminal at site (2). Namely, the phone A at site (1) has telephony communication with the phone O at site (2). FIG. 6 shows the flowchart of communication procedure between site (1) and site (2).

When the phone A at site (1) has telephony communication with the phone O at site (2), the phone B at site (1) still can dial an SIP number or receive phone call from another SIP number. The telephony communication of the phone B at site (1) will not be blocked by the telephony communication between the phone A at site (1) and the phone O at site (2). The phone B can establish telephony communication by creating new SIP control block with new SIP call-leg.

For example, when the phone B at site (1) dials an SIP number at site (3), all the phone X, phone Y and phone Z at site (3) will ring simultaneously. If the phone X at site (3) is off-hook, the telephony communication between the phone B at site (1) and the phone X at site (3) is established. At this time, the telephony communication between the phone A at site (1) and the phone O at site (2) is not bothered.

Similarly, when the phone Y at site (3) dials an SIP number at site (2), the IP telephony apparatus 10 at site (2) will create new SIP control block for the phone P and phone Q, while the phone O at site (2) is busy talking with phone A. The phone P and phone Q will ring and one of them establishes telephony communication with the phone Y at site (3).

Furthermore, when the phone Z at site (3) dials an SIP number at site (1), the users of phone A and phone B hear call-waiting tone and the users can switch their telephony communication to phone Z at site (3) by pressing a specific key such as transfer key or flash key. The specific key is pressed again to return to original communication. More over, the users phone A and phone B can press special key to cease the connection of the SIP control block from the phone Z, Therefore the users of phone A and phone B will not be bothered by the new coming call.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A method of providing simultaneous communication for multiple IP phones, the method comprising the steps of:
   (a) providing an IP telephony apparatus using an SIP protocol and a local SIP number;
   (b) connecting the IP telephony apparatus to a network and a plurality of telephone sets;
   (c) dialing a remote SIP number with at least one telephone set;
   (d) finding a local SIP number for communication with the remote SIP number by a mapped policy means;
   (e) examining whether an SIP control block is present;
   (f) creating at least one SIP control block containing an SIP call-leg for the local SIP number if the SIP control block is not present; and
   (g) allocating the SIP control block to the dialing telephone set according to the SIP call-leg and establishing a bi-directional digital voice packet transmission between the dialing telephone set and the remote SIP number if the SIP control block is present.

2. The method as in claim 1, wherein the step of providing an IP telephony apparatus includes providing one of an IP gateway, an ADSL modem, a cable modem and a wireless network access point.

3. The method as in claim 1, wherein the network is Internet.

4. The method as in claim 1, wherein the telephone set is a PSTN telephone set.

5. The method as in claim 1, wherein the SIP call-leg in step (f) comprises a call from field, a call to field and a call-ID field.

6. A method of providing simultaneous communication for multiple IP phones, the method comprising the steps of:
   (a) providing an IP telephony apparatus using an SIP protocol and a local SIP number;
   (b) connecting the IP telephony apparatus to a network and a plurality of telephone sets;
   (c) receiving a phone call from a remote SIP number for calling a local SIP number;
   (d) examining whether an SIP control block is present;
   (e) creating at least one SIP control block containing an SIP call-leg for a telephone group containing a plurality of telephone sets for making a ringing for all telephone sets in the telephone group if the SIP control block is not present; and
   (f) responsive to a telephone set of the telephone group being off hook, allocating the SIP control block to the off-hook telephone set and blocking the SIP control block from connecting to other telephone sets for establishing a bi-directional digital voice packet transmission between the off-hook telephone set and the remote SIP number.

7. The method as in claim 6, wherein the step of providing an IP telephony apparatus includes providing one of an IP gateway, an ADSL modem, a cable modem and a wireless network access point.

8. The method as in claim 6, wherein the network is Internet.

9. The method as in claim 6, wherein the telephone set is a PSTN telephone set.

10. The method as in claim 6, wherein the SIP call-leg comprises a call from field, a call to field and a call-ID field.

* * * * *